United States Patent
Cho et al.

(10) Patent No.: US 6,993,329 B2
(45) Date of Patent: Jan. 31, 2006

(54) APPARATUS AND METHOD FOR AUTOMATICALLY SWITCHING COMMUNICATION/COMMUNICATION SUPPRESSION MODE OF WIRELESS COMMUNICATION TERMINAL

(75) Inventors: Sung-Joon Cho, #31-103, Jangmi Apt., 11, Shincheon-dong, Songpa-ku, Seoul 138-240 (KR); Chang-Heon Oh, #110-704 LG Apt., 261, Cheongsu-dong, Cheonan-shi, Chungcheongnam-do 330-190 (KR); Jea-Sung Rho, #13-503 Jinju Apt., 20-4, Shincheon-dong, Songpa-ku, Seoul 138-240 (KR)

(73) Assignees: Hyundai Curitel, Inc., (KR); Sung-Joon Cho, (KR); Chang-Heon Oh, (KR); Jea-Sung Rho, (KR)

( * ) Notice: Subject to any disclaimer, the term of this patent is extended or adjusted under 35 U.S.C. 154(b) by 560 days.

(21) Appl. No.: 10/297,108

(22) PCT Filed: May 31, 2001

(86) PCT No.: PCT/KR01/00924

§ 371 (c)(1),
(2), (4) Date: Nov. 27, 2002

(87) PCT Pub. No.: WO01/93440

PCT Pub. Date: Dec. 6, 2001

(65) Prior Publication Data

US 2003/0139138 A1    Jul. 24, 2003

(30) Foreign Application Priority Data

May 31, 2000  (KR) .............................. 2000-29749

(51) Int. Cl.
*H04M 3/00*    (2006.01)
(52) U.S. Cl. ..................... 455/420; 455/419; 455/68; 455/88
(58) Field of Classification Search ................ 455/420, 455/419, 411, 410, 456.1, 456.3, 456.4, 456.6, 455/565, 68, 88, 343.1
See application file for complete search history.

(56) References Cited

U.S. PATENT DOCUMENTS

| | | | | |
|---|---|---|---|---|
| 5,659,595 A | * | 8/1997 | Chanu et al. ............... | 455/411 |
| 6,011,973 A | * | 1/2000 | Valentine et al. ......... | 455/456.6 |
| 6,122,486 A | * | 9/2000 | Tanaka et al. ............... | 455/68 |
| 6,343,213 B1 | * | 1/2002 | Steer et al. ................. | 455/411 |
| 6,421,544 B1 | * | 7/2002 | Sawada ....................... | 455/565 |
| 6,424,839 B1 | * | 7/2002 | Bruzzone ................. | 455/456.6 |
| 6,542,730 B1 | * | 4/2003 | Hosain ....................... | 455/410 |
| 6,832,093 B1 | * | 12/2004 | Ranta ....................... | 455/456.4 |

FOREIGN PATENT DOCUMENTS

| | | |
|---|---|---|
| EP | 1 035 747 A1 | 9/2000 |
| JP | 11-004478 | 1/1999 |
| JP | 11-075251 | 3/1999 |
| JP | 11-215561 | 8/1999 |
| JP | 2000-83278 | 3/2000 |
| KR | 1019980034681 | 8/1998 |
| KR | 1998-82079 | 11/1998 |
| KR | 2000-08299 | 2/2000 |
| KR | 2000-27087 | 5/2000 |

* cited by examiner

*Primary Examiner*—Nick Corsaro
*Assistant Examiner*—Lewis West
(74) *Attorney, Agent, or Firm*—Blakely Sokoloff Taylor & Zafman

(57) ABSTRACT

An apparatus and method for automatically switching communication/communication suppression mode of a wireless communication terminal is disclosed. The apparatus for automatically switching communication/communication suppression mode of the wireless communication terminal includes: a communication suppression control signal receipt unit for receiving a communication suppression control signal radiated from a control signal generation unit located in a communication suppression area; a communication suppression release control signal receipt unit for receiving a communication suppression release control signal radiated from a communication suppression release control signal generation unit located in an outside of the communication suppression area; and a switching unit for switching a transmission path of the wireless communication terminal off based on the communication suppression control signal and switching the transmission path of the wireless communication terminal on in order to return to the communication mode based on the communication suppression release control signal, so that the wireless communication terminal keeps its power on and radio frequency power is not radiated from the wireless communication terminal.

25 Claims, 9 Drawing Sheets

A : SET COMMUCATION SUPPRESSION MODE
B : RELEASE COMMUCATION SUPPRESSION MODE
D : AT TERMINATION OF TRAFFIC CHANNEL
E : AT FAIL IN CONNECTION TO SYSTEM
F : AT FAIL IN RECEIPT OF CONTROL SIGNAL FROM BASE STATION
G : AT REQUEST OF NORMAL CALL

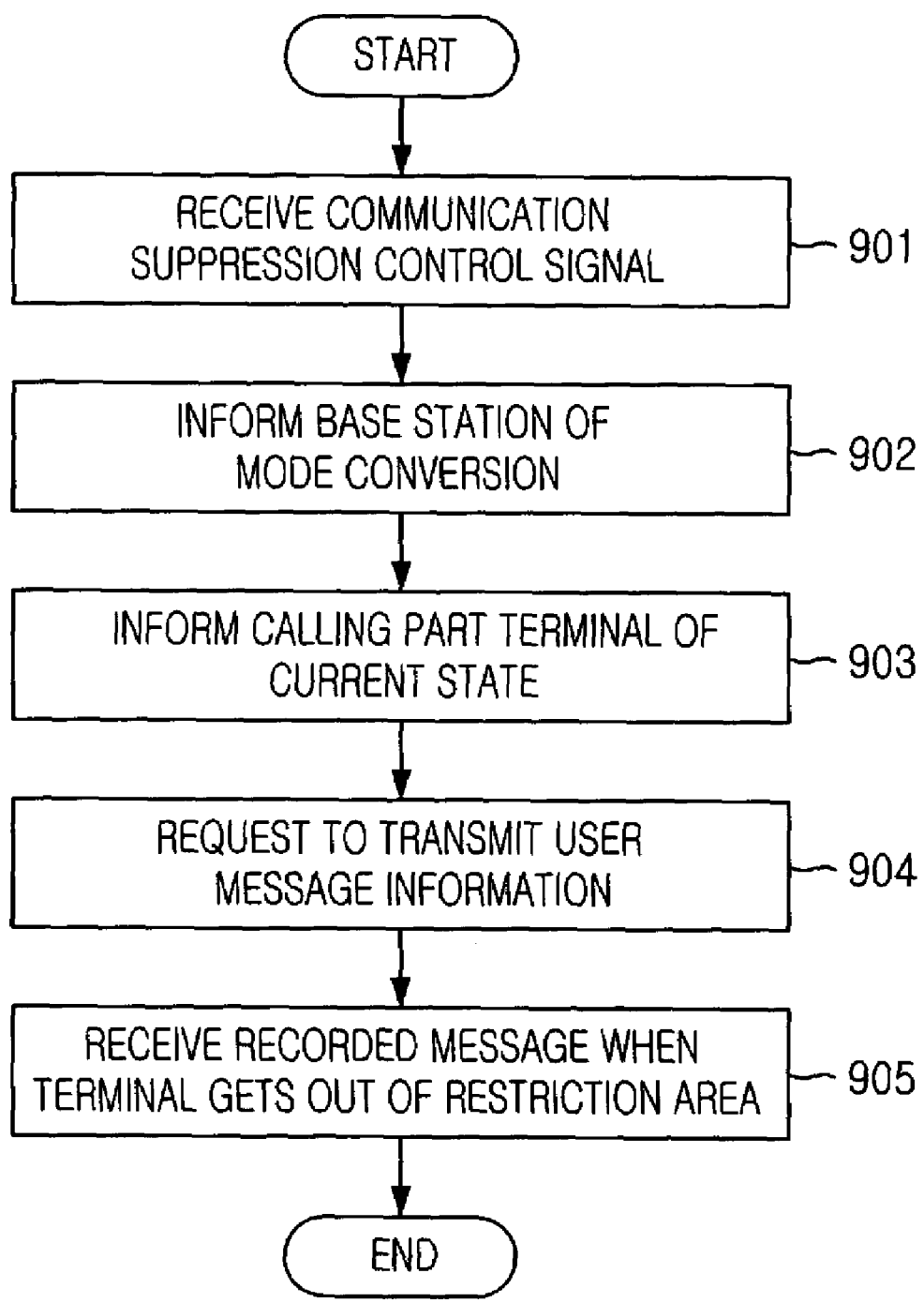

APPARATUS AND METHOD FOR AUTOMATICALLY SWITCHING COMMUNICATION/COMMUNICATION SUPPRESSION MODE OF WIRELESS COMMUNICATION TERMINAL

This is a non-provisional application claiming the benefit of International application number PCT/KR01/00924 filed May 31, 2001.

TECHNICAL FIELD

The present invention relates to an apparatus and method for automatically switching the communication/communication suppression mode of a wireless communication terminal; and more particularly to an apparatus and method for automatically switching the communication/communication suppression mode of a communication terminal, e.g., a mobile terminal, personal communication service (PCS), wireless paging terminal, PDA terminal and next-generation mobile telecommunication terminals, etc., which is automatically set in the mode of communication suppression when a communication terminal is in the communication restriction zone, and is switched back into communication mode when it is out of the restriction zone, and to a computer-readable recording medium for recording a program embodying the method.

BACKGROUND ART

Users have to manipulate a wireless communication terminal with their hand to turn on/off its power or change the ring mode from a bell-ringing mode to a vibration mode or from the vibration mode to the bell-ringing mode.

The wireless communication terminals forgotten to be set at vibration mode in public places such as a performance site, a hospital and so on, their bell-ringing cause a great deal of noise pollutions and further may serious accident of mechanical malfunction by the radio wave of the wireless communication terminals. The use of wireless communication terminals are staunchly restricted in regions such as the hospital or an airport where precision instruments operates, because a radio frequency (RF) signal may affect medical instruments or precision machinery.

Accordingly, a method of radiating low-powered jamming signals corresponding to the frequency band of the wireless communication terminals and keeping the transmit and receipt functions of the terminal away from working is put to practical use lately at public places, e.g., performance sites and so forth. Also suggested is a method generating a certain control signal and switching the ring mode of the mobile terminals from the bell ringing to the vibration.

However, these conventional methods have a shortcoming that it cannot basically block the RF radio waves that affect the operation of the medical machines and the precision machinery in a communication restriction area such as the hospital or the airplane.

Therefore, a user needs to turn off his wireless communication terminal himself to keep the affection of the RF in such places. However, this requires a lot of attention from the user, which leads to the need for an apparatus that automatically switches its mode.

This kind of apparatus needs a function to restrict the communication of the mobile terminal, i.e., RF radiation itself, by control signals from the outside. Also, it needs a function to release it back to communication mode when the user is out of the communication restriction area.

DISCLOSURE OF INVENTION

It is, therefore, an object of the present invention to provide an apparatus and method for automatically switching the communication/communication restriction mode that set a wireless communication terminal at the communication restriction mode when the terminal is in the communication restriction area according to control signals, and getting back to its communication mode when out of the area, and to a computer-readable recording medium for recording a program embodying the method.

It is another object of the present invention to provide an apparatus and method for automatically switching the communication/communication restriction mode, which the mobile terminal being kept power-on in a mobile communication restriction area, blocks RF radiation from the antenna, and then the terminal is switched back to the original communication mode when the communication suppression release signal is received or when the communication suppression signal is not received any more, and to a computer-readable recording medium for recording a program embodying the method.

It is yet another object of the present invention to provide an apparatus and method for automatically switching the communication/communication restriction mode, which keeping the mobile terminals on power, minimizes the power consumption by turning off the radio wave receipt mode, and to a computer-readable recording medium for recording a program embodying the method.

It is still another object of the present invention to provide an apparatus and method for automatically switching the communication/communication restriction mode, which reports to a base station of a mobile terminal being in the communication restriction area and switches it at communication suppression mode, and thus the base station recognizes that the terminal is in the communication restriction area, which is distinguished from being out of service zone, and does not page the corresponding wireless communication terminal any more, informing a user trying to reach the corresponding terminal of its entering the communication restriction area.

In accordance with one aspect of the present invention, there is provided an apparatus for automatically switching a communication/communication suppression mode of a wireless communication terminal, comprising: a communication a suppression control signal reception means for receiving a communication suppression control signal radiated from an external communication suppression control signal generation means that is set up inside an entrance of a communication restriction area, generates and radiates the communication suppression control signal which is a feeble radio signal; a communication suppression release control signal reception means for receiving a communication suppression release control signal from an external communication suppression release control signal generation means that is set up outside an exit of the communication restriction area, generates and radiates the communication suppression release control signal which is a feeble radio signal; and a transmit path on/off switching means for blocking a radio frequency (RF) signal radiated from an antenna of the terminal while keeping the wireless communication terminal power-on by receiving the communication suppression control signal from the communication suppression control signal reception means and turning off the transmit path of the wireless communication terminal, and for switching it into a normal communication mode by receiving the communication suppression release control signal from the communication suppression release control signal reception means and turning on the transmit path of the wireless communication terminal.

In accordance with another aspect of the present invention, there is provided an apparatus for automatically switching a communication/communication suppression mode of a wireless communication terminal, comprising: a communication a suppression control signal reception means for receiving a communication suppression control signal radiated from an external communication suppression control signal generation means that is set up inside an entrance of a communication restriction area, generates and radiates the communication suppression control signal which is a feeble radio signal; a communication suppression release control signal reception means for receiving a communication suppression release control signal from an external communication suppression release control signal generation means that is set up outside an exit of the communication restriction area, generates and radiates the communication suppression release control signal which is a feeble radio signal; a central processing means for receiving a communication suppression control signal from the communication suppression control signal reception means and notifying a base station of the wireless communication terminal being in the communication restriction area, and for controlling the wireless communication terminal to operate normally in response to the communication suppression release control signal from the communication suppression release control signal reception means; and a transmit path on/off switching means for blocking a radio frequency (RF) signal radiated from an antenna of the terminal while keeping the wireless communication terminal power-on by receiving the communication suppression control signal from the central processing means and turning off the transmit path of the wireless communication terminal, and for switching it into a normal communication mode by receiving the communication suppression release control signal from the central processing means and turning on the transmit path of the wireless communication terminal.

In accordance with further another aspect of the present invention, there is provided an apparatus for automatically switching a communication/communication suppression mode of a wireless communication terminal, comprising: a communication a suppression control signal reception means for receiving a communication suppression control signal radiated from an external communication suppression control signal generation means that is set up inside an entrance of a communication restriction area, generates and radiates the communication suppression control signal which is a feeble radio signal; a central processing means for receiving a communication suppression control signal from the communication suppression control signal reception means and notifying a base station of the wireless communication terminal being in the communication restriction area, and if the communication suppression control signal is not received from the communication suppression control signal reception means for a predetermined time, for controlling the wireless communication terminal to operate normally by transmitting a transmit path ON control signal; and a transmit path on/off switching means for blocking a radio frequency (RF) signal radiated from an antenna of the terminal while keeping the wireless communication terminal power-on by receiving the communication suppression control signal from the central processing means and turning off the transmit path of the wireless communication terminal, and for switching it into a normal communication mode by receiving the communication suppression release control signal from the central processing means and turning on the transmit path of the wireless communication terminal In accordance with further another aspect of the present invention, there is provided an apparatus for automatically switching a communication/communication suppression mode of a wireless communication terminal, comprising: a communication suppression control signal generation means set up inside an entrance of a communication restriction area, for generating and radiating a communication suppression control signal used for turning off a transmit path of the wireless communication terminal in order to block a radio frequency (RF) signal radiated from an antenna of the terminal while keeping the wireless communication terminal power-on; and a communication suppression release control signal generation means set up outside an exit of the communication restriction area, for generating and radiating a communication suppression release control signal used for turning on the transmit path of the wireless communication terminal in order to switch the wireless communication terminal into a normal communication mode from the communication suppression mode.

In accordance with further another aspect of the present invention, there is provided an apparatus for automatically switching the communication/communication suppression mode of a wireless communication terminal, comprising: a communication suppression control signal generation means set up inside an entrance of a communication restriction area, for notifying a base station of the wireless communication terminal being in the communication restriction area, for generating and radiating a communication suppression control signal used for turning off a transmit path of the wireless communication terminal in order to block a radio frequency (RF) signal radiated from an antenna of the terminal while keeping the wireless communication terminal power-on, and for, if the communication suppression control signal is not received for a predetermined time, turning on the transmit path of the wireless communication terminal in order to switch it into a normal communication mode.

In accordance with still further another aspect of the present invention, there is provided a method for automatically switching the communication/communication suppression mode of a wireless communication terminal, comprising the steps of: receiving a communication suppression control signal radiated from a communication suppression control signal generation means that is set up inside an entrance of a communication restriction area, generates and radiates the communication suppression control signal which is a feeble radio signal; b) turning off a transmit path of the wireless communication terminal in response to the communication suppression control signal in order to block a radio frequency (RF) signal radiated from an antenna of the wireless communication terminal while keeping the wireless communication terminal power-on; c) receiving a communication suppression release control signal from a communication suppression release control signal generation means that is set up outside an exit of the communication restriction area, generates and radiates the communication suppression release control signal which is a feeble radio signal; and d) turning on the transmit path of the wireless communication terminal in response to the communication suppression release control signal in order to switch the wireless communication terminal into a normal communication mode.

In accordance with still further another aspect of the present invention, there is provided a method for automatically switching the communication/communication suppression mode a wireless communication terminal, comprising the steps of: a) at a central processing means, receiving a communication suppression control signal radiated from an external communication suppression control signal generation means that is set up inside an entrance of a communication restriction area, generates and radiates the communication suppression control signal which is a feeble radio signal, through a communication suppression/communication suppression release control signal reception means; b) at the central processing means, notifying a base station of the wireless communication terminal being in the communication restriction area; c) at the central processing means, turning off a transmit path of the wireless communication terminal in response to the communication suppression control signal in order to block a radio frequency (RF) signal radiated from an antenna of the wireless communication terminal while keeping the wireless communication terminal power-on; d) at the central processing means, receiving a communication suppression release control signal from a communication suppression release control signal generation means that is set up outside an exit of the communication restriction area, generates and radiates the communication suppression release control signal which is a feeble radio signal, through a communication suppression/communication suppression release control signal reception means; and e) at the central processing means, controlling a transmit path on/off switching means to turn on the transmit path of the wireless communication terminal in order to switch the wireless communication terminal into a normal communication mode.

In accordance with still further another aspect of the present invention, there is provided a method for automatically switching the communication/communication suppression mode of a wireless communication terminal, comprising the steps of: a) at a central processing means, checking whether a communication suppression control signal radiated from a communication suppression control signal generation means that is set up inside an entrance of a communication restriction area, generates and radiates the communication suppression control signal which is a feeble radio signal; b) if the communication suppression control signal is received, determining whether the wireless communication terminal is in a communication suppression mode, if so, proceeding to the step a), if not, controlling the transmit path on/off switching means to turn off a transmit path of the wireless communication terminal in response to the communication suppression control signal in order to block a radio frequency (RF) signal radiated from an antenna of the wireless communication terminal while keeping the wireless communication terminal power-on; and c) if the communication suppression control signal is not received for a predetermined time, controlling the transmit path on/off switching means to turn on the transmit path of the terminal in order to switch the wireless communication terminal into normal communication mode.

In accordance with still further another aspect of the present invention, there is provided a computer readable recording medium for recording a program for executing a method for automatically switching the communication/communication suppression mode of a wireless communication terminal, the method comprising the steps of: receiving a communication suppression control signal radiated from a communication suppression control signal generation means that is set up inside an entrance of a communication restriction area, generates and radiates the communication suppression control signal which is a feeble radio signal; b) turning off a transmit path of the wireless communication terminal in response to the communication suppression control signal in order to block a radio frequency (RF) signal radiated from an antenna of the wireless communication terminal while keeping the wireless communication terminal power-on; c) receiving a communication suppression release control signal from a communication suppression release control signal generation means that is set up outside an exit of the communication restriction area, generates and radiates the communication suppression release control signal which is a feeble radio signal; and d) turning on the transmit path of the wireless communication terminal in response to the communication suppression release control signal in order to switch the wireless communication terminal into a normal communication mode.

In accordance with still further another aspect of the present invention, there is provided a 26. A computer readable recording medium for recording a program for executing a method for automatically switching the communication/communication suppression mode a wireless communication terminal, the method comprising the steps of: a) at a central processing means, receiving a communication suppression control signal radiated from an external communication suppression control signal generation means that is set up inside an entrance of a communication restriction area, generates and radiates the communication suppression control signal which is a feeble radio signal, through a communication suppression/communication suppression release control signal reception means; b) at the central processing means, notifying a base station of the wireless communication terminal being in the communication restriction area; c) at the central processing means, turning off a transmit path of the wireless communication terminal in response to the communication suppression control signal in order to block a radio frequency (RF) signal radiated from an antenna of the wireless communication terminal while keeping the wireless communication terminal power-on; d) at the central processing means, receiving a communication suppression release control signal from a communication suppression release control signal generation means that is set up outside an exit of the communication restriction area, generates and radiates the communication suppression release control signal which is a feeble radio signal, through a communication suppression/communication suppression release control signal reception means; and e) at the central processing means, controlling a transmit path on/off switching means to turn on the transmit path of the wireless communication terminal in order to switch the wireless communication terminal into a normal communication mode.

In accordance with yet further another aspect of the present invention, there is provided a computer readable recording medium for recording a program for executing a method for automatically switching the communication/communication suppression mode of a wireless communication terminal, the method comprising the steps of:

a) at a central processing means, checking whether a communication suppression control signal radiated from a communication suppression control signal generation means that is set up inside an entrance of a communication restriction area, generates and radiates the communication suppression control signal which is a feeble radio signal;

b) if the communication suppression control signal is received, determining whether the wireless communication terminal is in a communication suppression mode, if so, proceeding to the step a), if not, controlling the transmit path on/off switching means to turn off a transmit path of the wireless communication terminal in response to the communication suppression control signal in order to block a radio frequency (RF) signal radiated from an antenna of the wireless communication terminal while keeping the wireless communication terminal power-on; and c) if the communication suppression control signal is not received for a predetermined time, controlling the transmit path on/off switching means to turn on the transmit path of the terminal in order to switch the wireless communication terminal into normal communication mode.

Generally, in a communication restriction area the wireless communication terminal needs a function of controlling the RF radiated from the terminal with an external communication suppression control signal. Also, when a user is out of the communication restriction area, his wireless communication terminal should be switched back into normal communication mode.

Considering this point, it's inconvenient to have the terminal power-off physically because it is not turned on automatically.

Therefore, the wireless communication terminal should hold in the unnecessary RF radiation and keep the terminal power-on in the communication restriction area for the user's convenience and its antenna should not remit the RF.

Also, the power consumption of the wireless communication terminal should be minimized by turning off the reception mode, thus reducing software burden on the terminal.

In this case described above, the wireless communication terminal cannot receive signal from a base station and cannot radiate RF because its transmit mode is off, either. However, the inside of the wireless communication terminal being power-on, it can be switched back to communication mode when communication suppression release signal is received, or communication suppression control signal is not received any more.

The properties of the present invention above will be described hereinafter.

The present invention simply modifies softwares and hardwares and suppressing the RF radiation of a wireless communication terminal by switching the transmit (Tx) and receipt (Rx) paths on and off located at the end of RF of the terminal when receiving communication suppression control signal, and minimizes power consumption of the terminal by turning off the reception mode during the period. And when the user is out of the communication restriction area, that is, when communication suppression release signal is received, or communication suppression control signal is not received any more, the transmit (Tx) and receipt (Rx) paths are turned automatically. The wireless communication terminal communicates with a base station upon the receipt of signals from a base station through access channels of the terminal, its operation is recovered and works.

To achieve these functions, when a user is in a region where communication is restricted, communication repression control signal is radiated and switch the wireless communication terminal into communication suppression mode, and when the user gets out of it, the terminal should be switched back into normal communication mode when communication suppression release control signal is received or communication suppression control signal is not received.

Here, the wireless communication terminal should notify a corresponding base station of its being in a communication restriction area and switch itself into communication suppression mode. Then the base station recognizes that the terminal is in a communication restriction area, which is distinguished from getting out of a service coverage zone. This way, the base station acknowledges that the wireless communication terminal is in a communication restriction area and does not page it any more. Therefore, the base station can enjoy the reduction of power consumption as well as an effect that is the same as enlarging the channel capacity of the base station. Also, the base station informs a caller who are trying to reach the wireless communication terminal that the terminal is in a communication restriction area.

BRIEF DESCRIPTION OF DRAWINGS

The above and other objects and features of the present invention will become apparent from the following description of the preferred embodiments given in conjunction with the accompanying drawings, in which:

FIG. 9 is a detailed flow chart depicting the process of notifying a base station of the terminal switching into the communication suppression mode in accordance with an embodiment of the present invention.

BEST MODE FOR CARRYING OUT THE INVENTION

Other objects and aspects of the invention will become apparent from the following description of the embodiments with reference to the accompanying drawings, which is set forth hereinafter.

Figure 1:
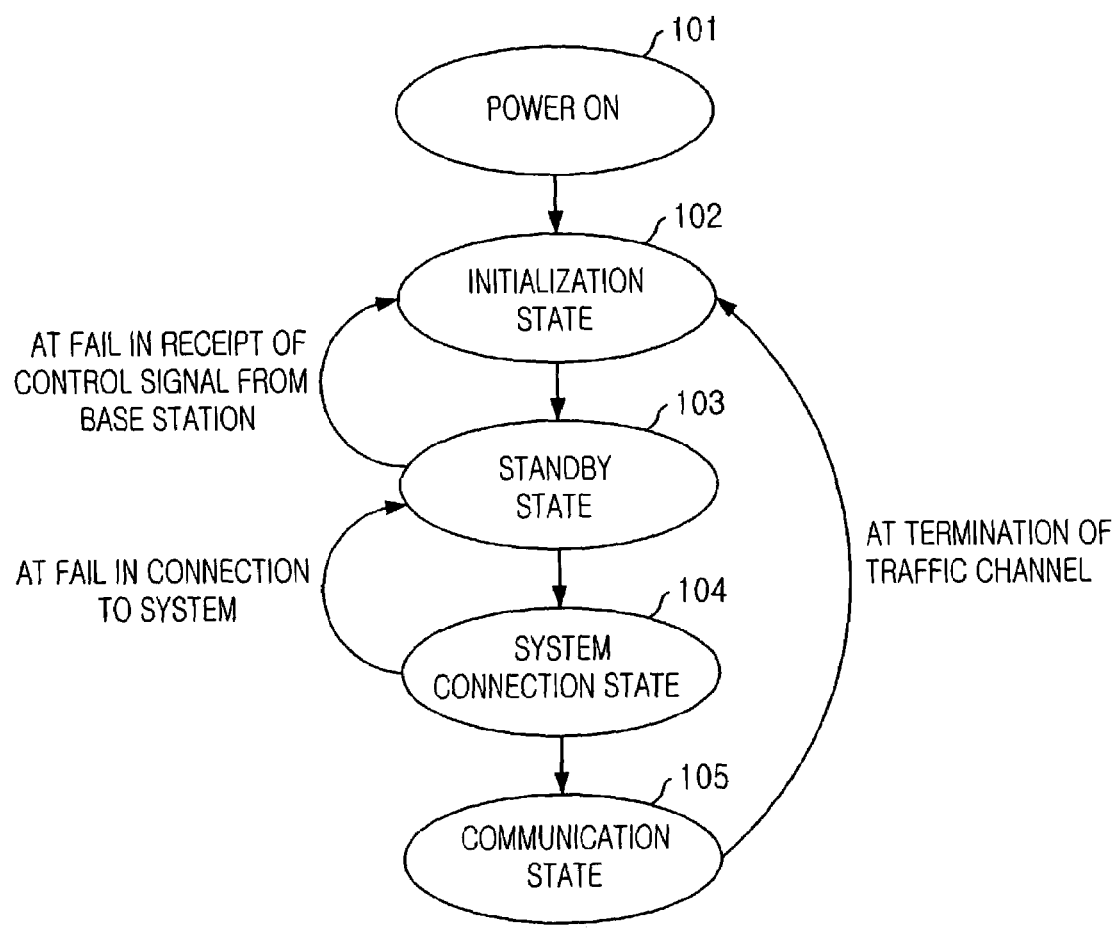
FIG. 1 is a flow chart showing the method of general call processing of a wireless communication terminal in accordance with an embodiment of the present invention.

FIG. 1 is a flow chart showing the method of general call processing of a wireless communication terminal in accordance with an embodiment of the present invention.

To have a look at the procedures of call processing of a conventional wireless communication terminal, first when turning on the power of a wireless communication terminal 101, necessary system information is read in from the EEPROM and set on the RAM, and then the terminal receives information channels from a base station.

In the initialization state 102, the wireless communication terminal is booted and receives the pilot channel and the synchronous channel.

Then, in the standby state 103, the terminal continues to receive the paging channel after receiving all the system information and terminating normal operation. Here, if it does not receive control signal through the paging channel from the base station, it proceeds to the initialization state 102 and receives the pilot channel and the synchronous channel.

The system connection state 104 is a state for a wireless communication terminal to access to the system. Here, if it fails to access, the wireless terminal goes back to the standby state 103 and receives the paging channel.

The communication state 105 is a state where a wireless communication terminal is on the line. If the line is terminated in the mid of call communication, the wireless terminal returns to the initialization state 102 and receives the pilot channel and the synchronous channel.

Figure 2:
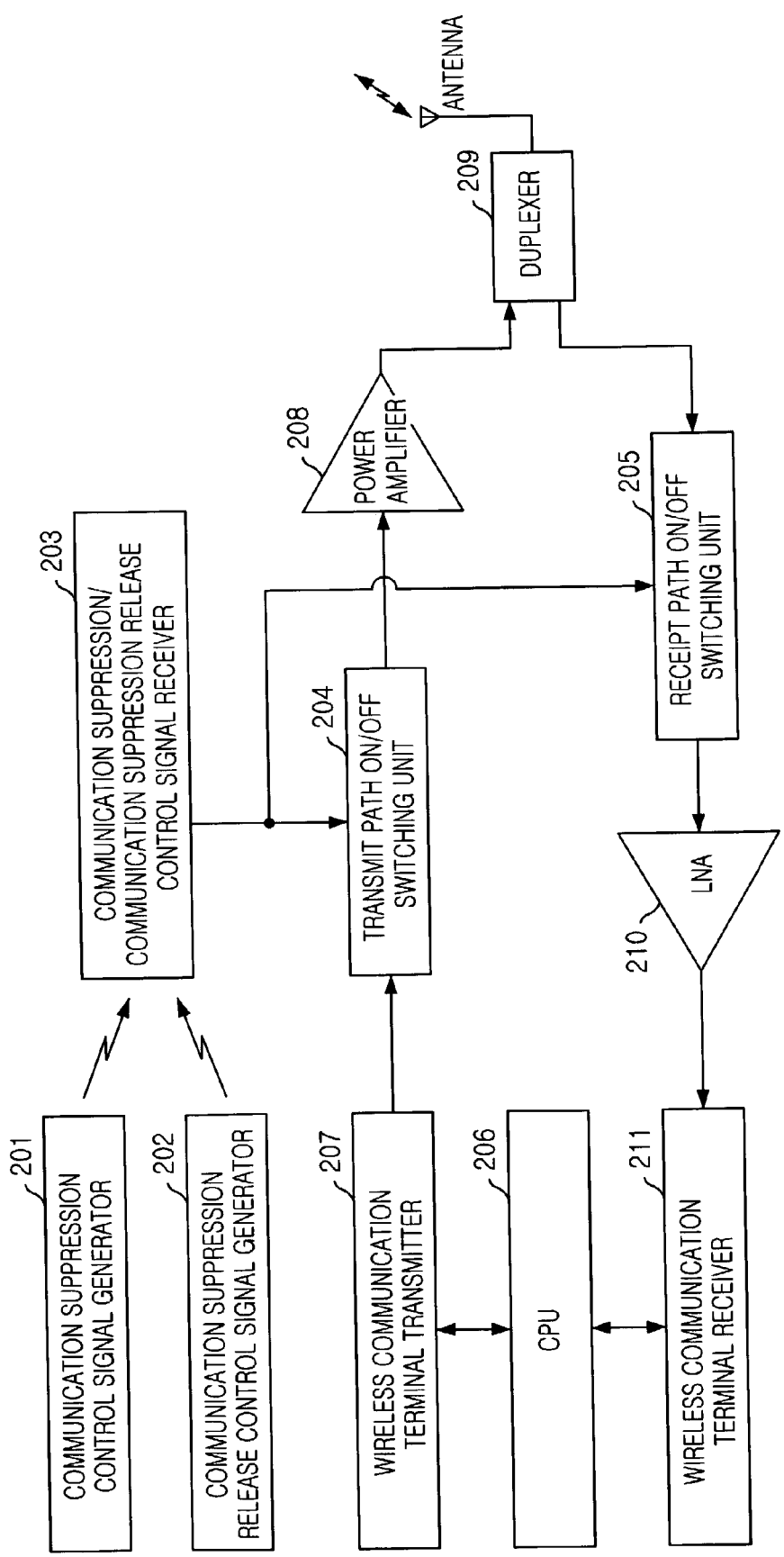
FIG. 2 is a block diagram depicting an apparatus for automatically switching the communication/communication suppression mode of the wireless communication terminal in accordance with an embodiment of the present invention.

FIG. 2 is a block diagram depicting an apparatus for automatically switching the communication/communication suppression mode of the wireless communication terminal in accordance with an embodiment of the present invention. This embodiment includes a communication suppression control signal generator 201 and communication suppression release control signal generator 202 set up at the entrance and exit of the communication restriction area, respectively.

The apparatus for automatically switching the communication/communication suppression mode in accordance with the present invention includes: a communication suppression control signal generator 201 installed inside the entrance of an area where call communication needs to be restricted such as a hospital and an airplane for generating communication suppression control signal and radiating it in the form of a feeble radio wave (0 dBm(1 mW)~13 dBm(20 mW)); a communication suppression release control signal generator 202 set up outside the exit of the area where call communication needs to be restricted such as a hospital and an airplane for generating communication suppression release control signal and radiating it in the form of a feeble radio wave; a communication suppression/communication suppression release control signal receptor 203 for receiving the communication suppression control signal from the communication suppression control signal generator 201 and the communication suppression release control signal from the communication suppression release control signal generator 202 and transmitting them to a transmit path on/off switching block 204; and a transmit path on/off switching block 204 for receiving the communication suppression control signal from the communication suppression/communication suppression release control signal receptor 203 and turning off the transmit path of the wireless communication terminal, blocking the RF radiation out of the terminal antenna while keeping the terminal power-on, and receiving communication suppression release control signal from the communication suppression/communication suppression release control signal receptor 203 and switching the transmit path of the wireless communication terminal into communication mode.

Also, the apparatus for automatically switching the communication/communication suppression mode in accordance with the present invention further includes a receipt path on/off switching block 205 for receiving the communication suppression control signal from the communication suppression/communication suppression release control signal receptor 203 and minimizing the power consumption of the terminal by turning off the receipt path of the wireless communication terminal, and receiving communication suppression release control signal from the communication suppression/communication suppression release control signal receptor 203 and switching the wireless communication terminal into communication mode by turning on the receipt path.

Besides, there are a central processing unit 206, wireless communication terminal transmitter 207, power amplifier 208, duplexer 209, low noise amplifier 210, wireless communication terminal receptor 211, etc. But detailed description on them will be omitted here because their operation in the wireless communication terminal is similar to that of a conventional wireless communication terminal.

Figure 3:
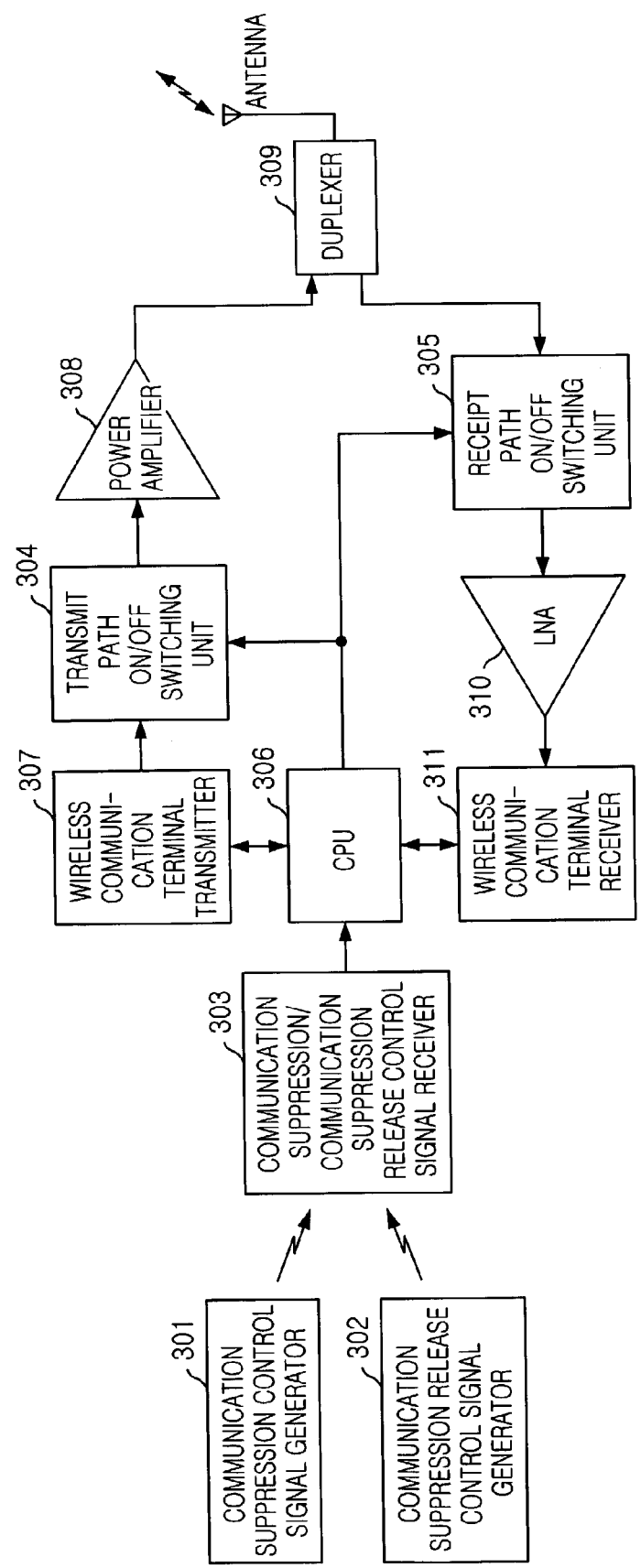
FIG. 3 is a block diagram illustrating an apparatus for automatically switching the communication/communication suppression mode of the wireless communication terminal in accordance with another embodiment of the present invention.

FIG. 3 is a block diagram illustrating an apparatus for automatically switching the communication/communication suppression mode of the wireless communication terminal in accordance with another embodiment of the present invention. In this embodiment, a communication suppression control signal generator 301 and a communication suppression release control signal generator 302 are installed at the entrance and exit, respectively but the transmit/receipt path on/off switching block 304, 305 are controlled through the central processing unit 306.

The apparatus for automatically switching the communication/communication suppression mode in accordance with the present invention comprises: a communication suppression control signal generator 301 installed inside an entrance of an area where call communication needs to be restricted such as a hospital and an airplane for generating communication suppression control signal and radiating it in the form of a feeble radio wave (0 dBm(1 mW)~13 dBm(20 mW)); a communication suppression release control signal generator 302 set up outside the exit of the area where call communication needs to be restricted such as a hospital and an airplane for generating communication suppression release control signal and radiating it in the form of a feeble radio wave; a communication suppression/communication suppression release control signal receptor 303 for receiving the communication suppression control signal from the communication suppression control signal generator 301 and the communication suppression release control signal from the communication suppression release control signal generator 302 and transmitting them to a the central processing unit 306; a central processing unit 306 for receiving communication suppression control signal from the communication suppression/communication suppression release control signal receptor 303 and transmitting to a base station the information that the corresponding mobile terminal is in the communication restriction area though the wireless communication terminal transmitter 307, transmit path on/off switching block 304, power amplifier 308, duplexer 309 and antenna, then transmitting the communication suppression control signal to the transmit path on/off switching block 304, receiving the communication suppression control signal from the communication suppression/communication suppression release control signal receptor 303, and transmitting it to the transmit path on/off switching block 304 and going back to its normal operation; and a transmit path on/off switching block 304 for receiving communication suppression control signal from the central processing unit 306, keeping the wireless terminal power-on and blocking RF radiation from its antenna by turning off the transmit path of the terminal, and then turning on the transmit path again and getting the terminal back to the communication mode.

Also, the apparatus for automatically switching the communication/communication suppression mode in accordance with the present invention further includes a receipt path on/off switching block 305 for receiving the communication suppression control signal from the central processing unit 306 and minimizing the power consumption of the terminal by turning off the receipt path of the wireless communication terminal, and receiving communication suppression release control signal from the central processing unit 306 and switching the wireless communication terminal into communication mode by turning on its receipt path.

Also, the receipt path on/off switching block 305 can receive the communication suppression/communication suppression release control signal directly from the communication suppression/communication suppression release control signal receptor 303 turn on/off the receipt path of the wireless communication terminal, not receiving the communication suppression/communication suppression control signal through the central processing unit 306.

Here, if the central processing unit 306 informs the base station of a wireless communication terminal being in the communication restriction area and being switched into communication suppression mode, the base station recognizes that the terminal is in the communication restriction area, which is distinguished from getting out of a region where communication is possible, does not page the corresponding terminal and informs a user trying to reach it that the corresponding terminal is in a communication restriction area.

Besides, there are a central processing unit 306, wireless communication terminal transmitter 307, power amplifier 308, duplexer 309, low noise amplifier 310, wireless communication terminal receptor 311, etc. But detailed description on them will be omitted here because their operation in the wireless communication terminal is similar to that of a conventional wireless communication terminal.

Figure 4:
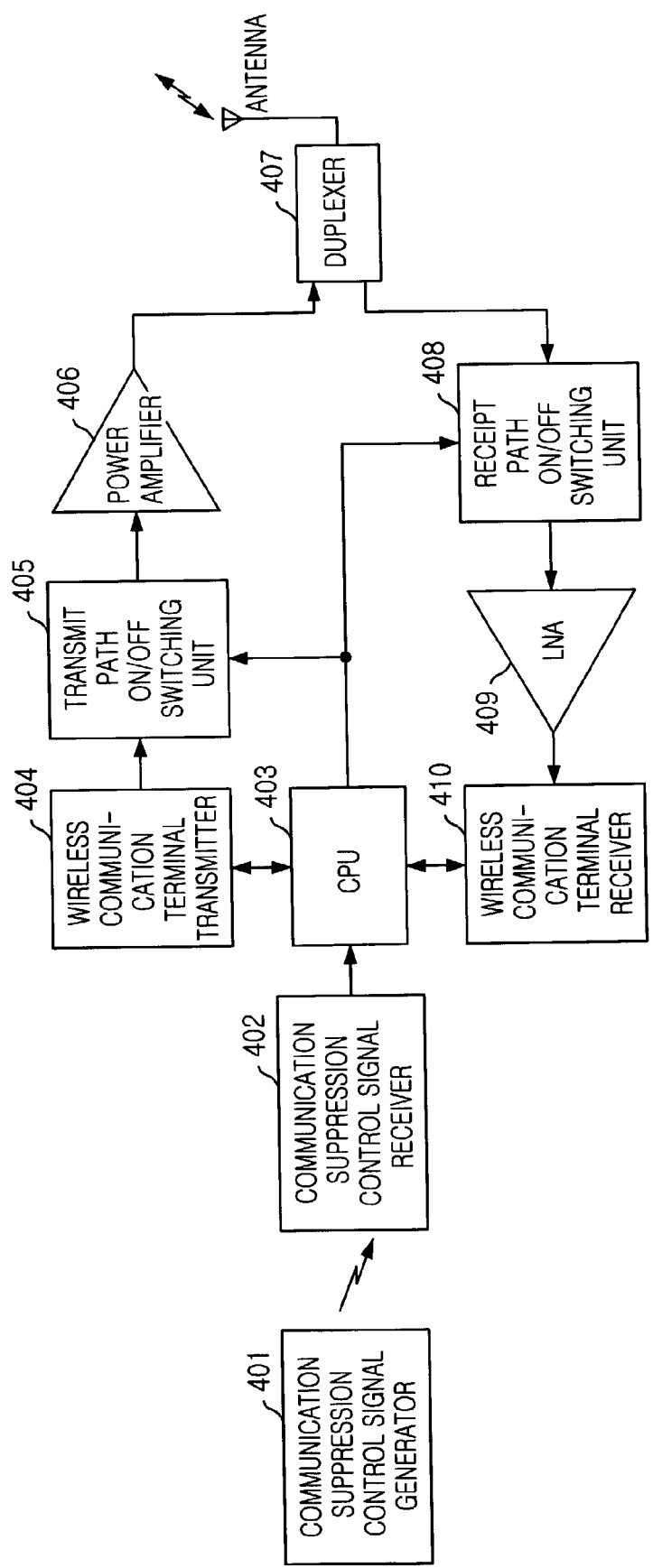
FIG. 4 is a block diagram depicting an apparatus for automatically switching the communication/communication suppression mode of the wireless communication terminal in accordance with yet another embodiment of the present invention.

FIG. 4 is a block diagram depicting an apparatus for automatically switching the communication/communication suppression mode of the wireless communication terminal in accordance with yet another embodiment of the present invention. In this embodiment, the communication suppression control signal generator 401 is installed to cover the entire communication restriction area and the transmit/receipt path on/off switching blocks 405, 408 are controlled through the central processing unit 403.

The apparatus for automatically switching the communication/communication suppression mode in accordance with the present invention comprises: a communication suppression control signal generator 401 installed in an area where communication is needed to be restricted such as a hospital or an airplane for generating communication suppression control signal and radiate it in the form of a feeble radio wave (0 dBm(1 mW)~13 dBm(20 mW)) continuously on the entire communication restriction area; a communication suppression control signal receptor 402 for receiving the communication suppression control signal and transmitting it to a central processing unit 403 of the wireless communication terminal; a central processing unit 403 for receiving communication suppression control signal from the communication suppression control signal receptor 402 and transmitting to a base station the information that the corresponding mobile terminal is in the communication restriction area through the wireless communication terminal transmitter 404, transmit path on/off switching block 405, power amplifier 406, duplexer 407 and antenna, then transmitting the communication suppression control signal to the transmit path on/off switching block 405, if the communication suppression control signal is not received at the communication suppression control signal receptor 402 for a predetermined period, for example for five seconds or so, controlling the transmit path on/off switching block 405 to turn on the transmit path, and going back to its normal operation; a transmit path on/off switching block 405 for receiving communication suppression control signal from the central processing unit 403, keeping the wireless terminal power-on and blocking RF radiation from its antenna by turning off the transmit path of the terminal, then turning on the transmit path again and getting the terminal back to communication mode.

Also, the apparatus for automatically switching the communication/communication suppression mode in accordance with the present invention further includes a receipt path on/off switching block 408 for receiving the communication suppression control signal from the central processing unit 403 and minimizing the power consumption of the terminal by turning off the receipt path of the wireless communication terminal, then turning on the receipt path of the wireless terminal according to the control of the central processing unit 403 and getting it back to the communication mode.

Here, if the central processing unit 403 informs the base station of a wireless communication terminal being in the communication restriction area and being switched into communication suppression mode, the base station recognizes that the terminal is in the communication restriction area, which is distinguished from getting out of a region where communication is possible, does not page the corresponding terminal and informs a user trying to reach it that the corresponding terminal is in a communication restriction area.

Besides, there are central processing unit 403, wireless communication terminal transmitter 404, power amplifier 406, duplexer 407, low noise amplifier 409, wireless communication terminal receptor 410, etc. But detailed description on them will be omitted here because their operation in the wireless communication terminal is similar to that of a conventional wireless communication terminal.

Unlike the conventional methods in which a plurality of transmit channels are amplified through power amplifier and transmitted through an antenna, the embodiments of the present invention above can contain the RF radiation from the terminal antenna by turning off the input signal into the power amplifier on the transmit (Tx) path of the wireless communication terminal while being switched into communication suppression mode. Also, in order to reduce the burden of wireless communication terminal softwares that occur by the receipt of control signal from a base station, input signals into the low noise amplifier on the receipt (Rx) path of the terminal are turned off.

Figure 5:
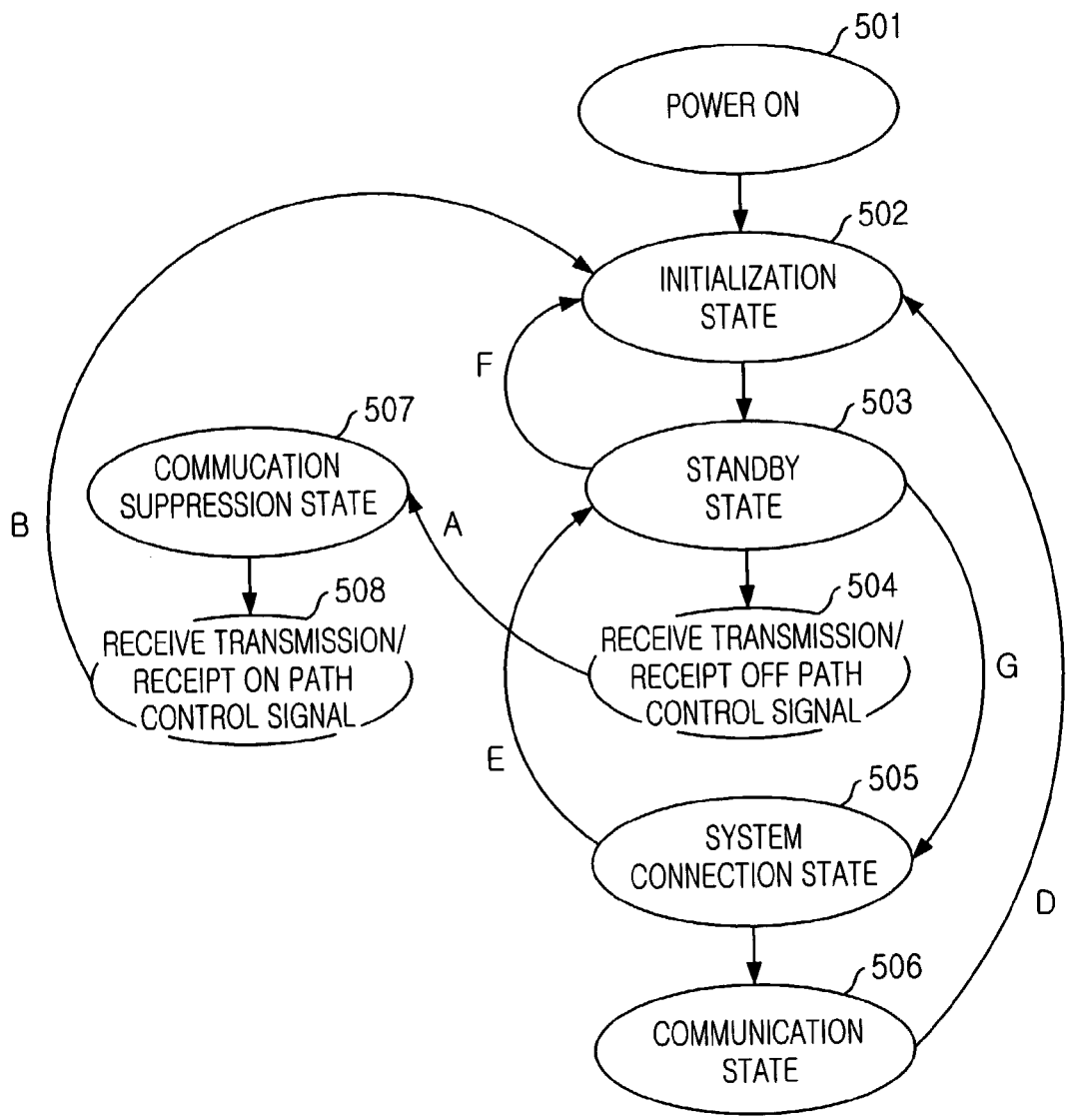
FIG. 5 is a flow chart showing a method for automatically switching the communication/communication suppression mode of the wireless communication terminal in accordance with an embodiment of the present invention.

FIG. 5 is a flow chart showing a method for automatically switching the communication/communication suppression mode of the wireless communication terminal in accordance with an embodiment of the present invention. When maintaining the current call processing procedures and receiving transmit/receipt path OFF control signal in a communication restriction area, the transmit/receipt path of the terminal is turned off, and when getting out of the area and receiving the transmit/receipt path ON control signal, the transmit/receipt path is turned on and switched into communication mode.

To have a look at the call processing procedures of a wireless communication terminal in accordance with the present invention, when power is turned on 501, the wireless communication terminal reads in necessary system information from the EEPROM and receives information channels from a base station.

In the initialization state 502, the wireless communication terminal is booted and receives the pilot channel and the synchronous channel.

Then, in the standby state 503, the terminal continues to receive the paging channel, after it receives all the system information and terminates normal operation. Here, if it does not receive control signal through the paging channel from the base station, it returns to the initialization state 502 and receives the pilot channel and the synchronous channel.

The system connection state 505 is a state for a wireless communication terminal to access to the system. Here, if it fails to access, the wireless terminal goes back to the standby state 503 and continues to receive the paging channel.

The communication state 506 is a state where a wireless communication terminal is on the line. If the line is terminated in the mid of call communication, the wireless terminal returns to the initialization state 502 and receives the pilot channel and the synchronous channel.

Meanwhile, in the standby state 503, if the transmit/receipt path OFF control signal of the terminal is received 504, the terminal is set at communication suppression mode and goes to the communication suppression state 507. Here, the wireless communication terminal turns off the transmit/receipt path and blocks the RF radiation from the terminal antenna while keeping its power on.

Being power-on, if the transmit/receipt path ON signal is received 508, the terminal goes to the initialization state 502 to be switched back into communication mode.

Meanwhile, in another embodiment, if the transmit/receipt path OFF control signal continues to be received, the wireless communication terminal maintains the communication suppression state 507, and if the transmit/receipt path OFF control signal is not received for a predetermined time, for example for five seconds or so, the terminal goes to the system connection state 505 to be switched back into the communication mode.

In yet another embodiment, it is possible to control the transmit path of a wireless communication terminal only, not controlling its receipt path.

Figure 6:
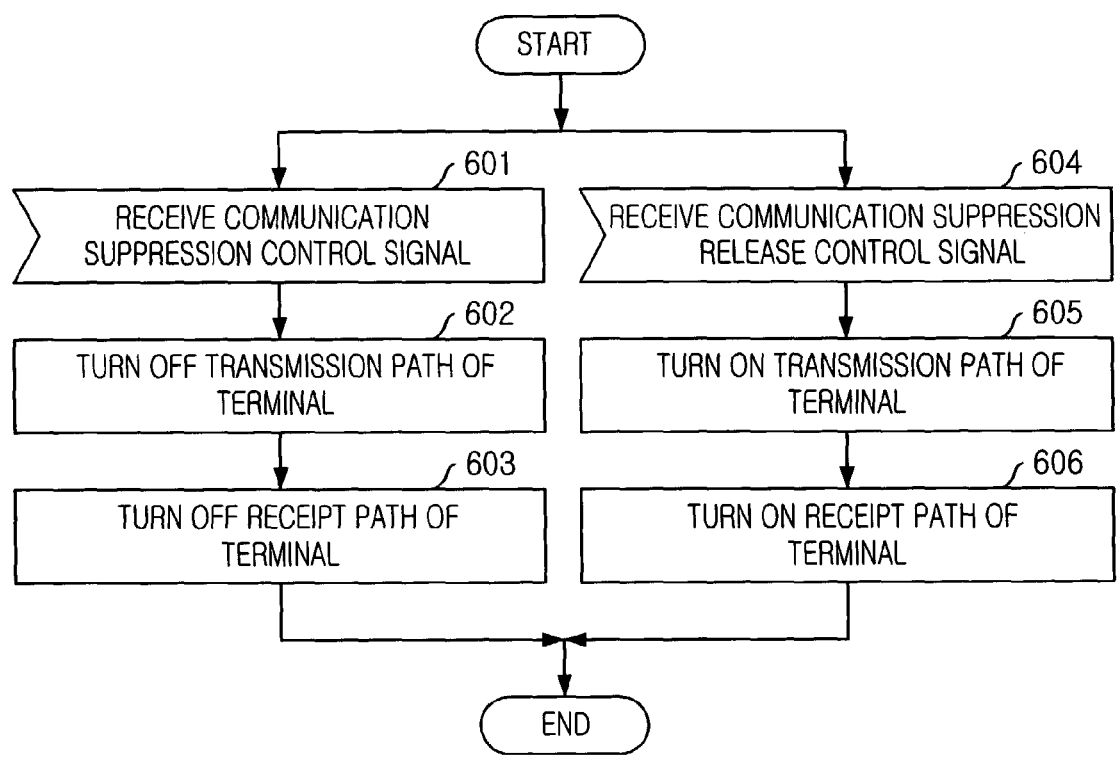
FIG. 6 is a flow chart depicting a method for automatically switching the communication/communication suppression mode of the wireless communication terminal in accordance with a concrete embodiment of the present invention.
Figure 7:
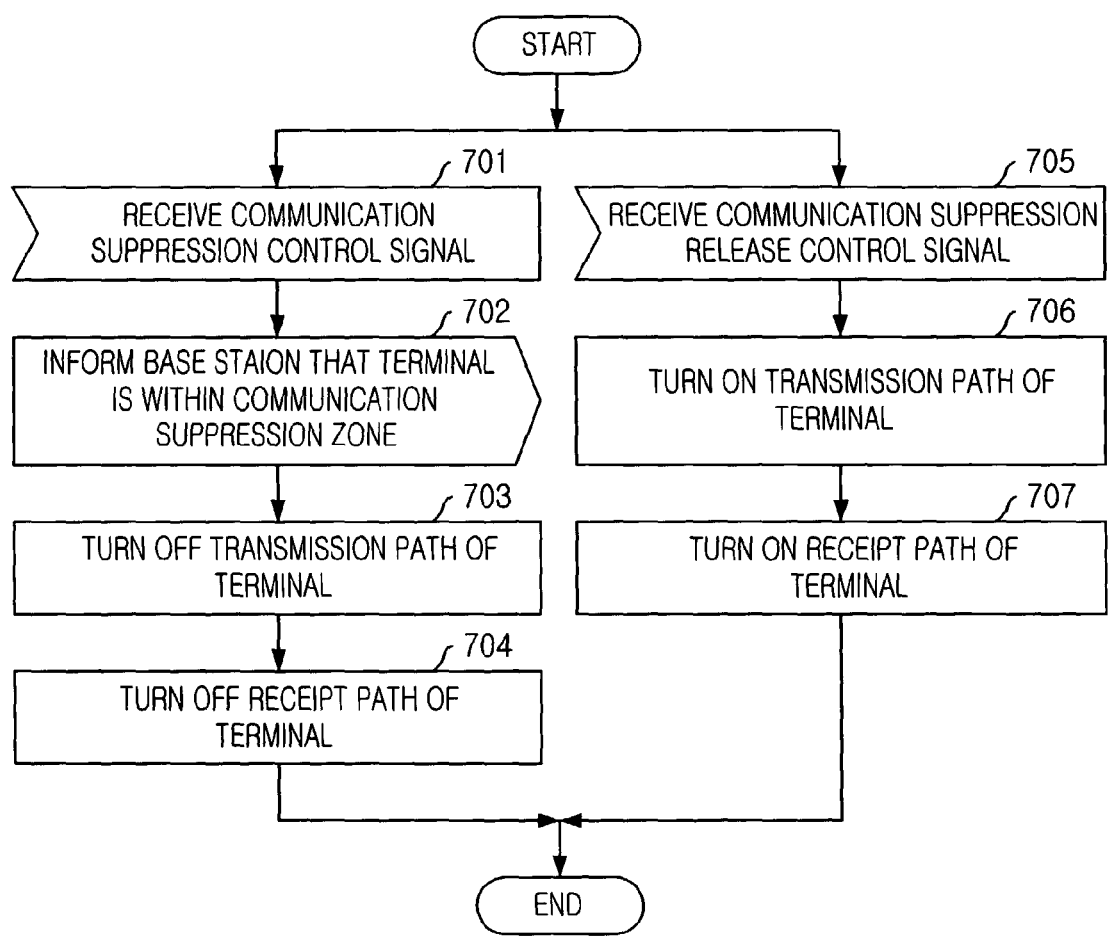
FIG. 7 is a flow chart showing a method for automatically switching the communication/communication suppression mode of the wireless communication terminal in accordance with another concrete embodiment of the present invention.
Figure 8:
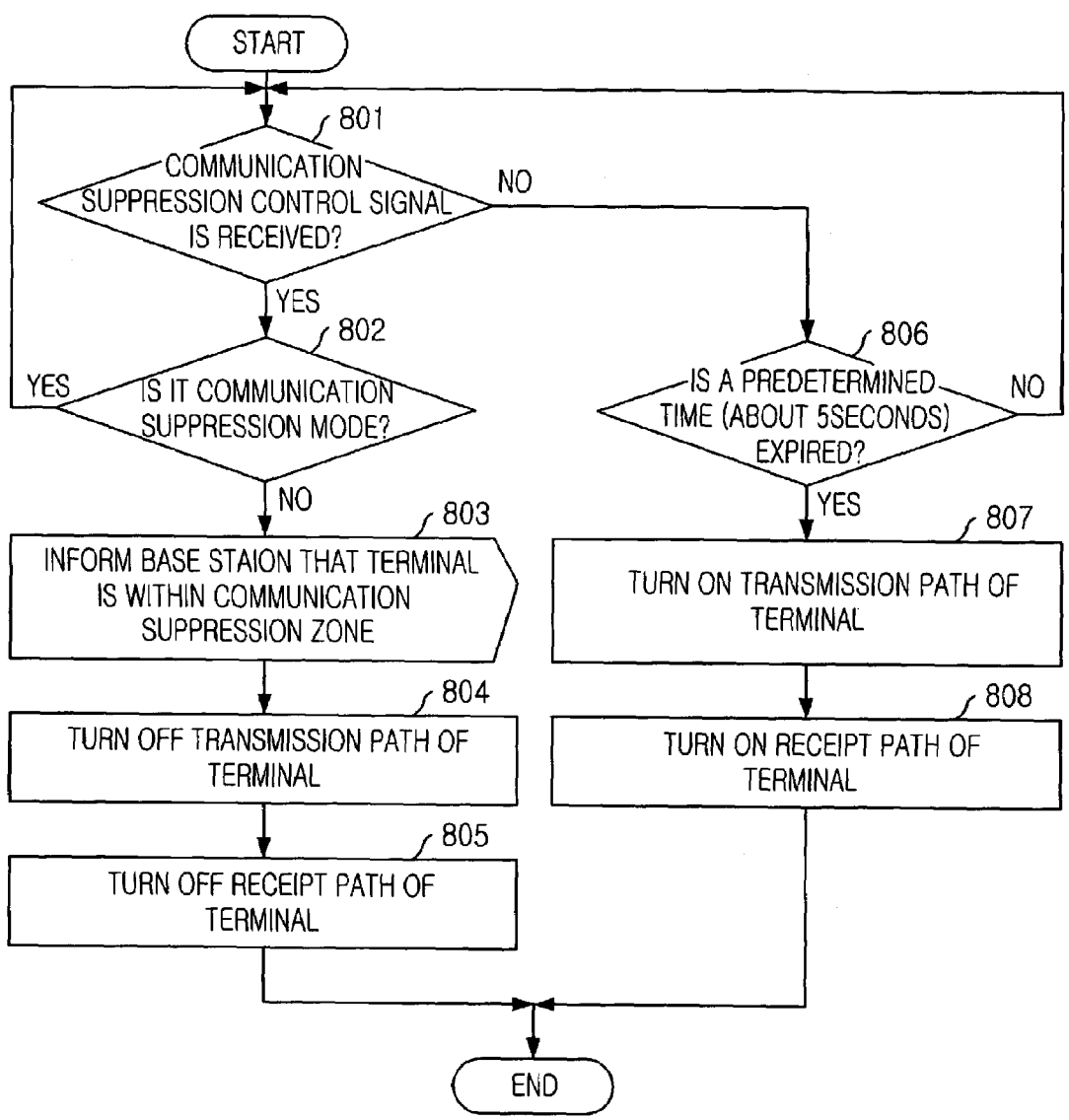
FIG. 8 is a flow chart showing a method for automatically switching the communication/communication suppression mode of the wireless communication terminal in accordance with still another concrete embodiment of the present invention.

Referring to FIGS. 6 to 8, a method for automatically switching the communication/communication suppression mode of each embodiment is described in detail hereinafter.

FIG. 6 is a flow chart depicting a method for automatically switching the communication/communication suppression mode of the wireless communication terminal in accordance with a concrete embodiment of the present invention. In this embodiment, the communication suppression control signal generator 201 and communication suppression release control signal generator 202 are set up at the entrance and exit, respectively.

First of all, the communication suppression/communication suppression release control signal receptor 203 receives communication suppression control signal from the communication suppression control signal generator 201, which being installed inside the entrance of a region where call communication needs to be restricted such as a hospital or an airplane, generates communication suppression control signal and radiates it in the form of a feeble radio wave (0 dBm(1 mW)~13 dBm(20 mW)) 601.

Then, the transmit path on/off switching block 204 blocks the RF radiation from the terminal antenna by receiving communication suppression control signal from the communication suppression/communication suppression release control signal receptor 203 and turning off the transmit path of the wireless communication terminal, while keeping the terminal power-on 602.

Further, the receipt path on/off switching block 205 may conduct the procedure 603 of minimizing power consumption of the wireless communication terminal by receiving communication suppression control signal from the communication suppression/communication suppression release control signal receptor 203 and turning off the receipt path of the terminal.

Meanwhile, the communication suppression/communication suppression release control signal receptor 203 receives communication suppression release control signal from the communication suppression release control signal generator 202, which being installed outside the exit of a region where call communication needs to be restricted such as a hospital or an airplane, generates communication suppression release control signal and radiates it in the form of a feeble radio wave 604.

After that, the transmit path on/off switching block 204 switches the terminal into normal communication mode by receiving communication suppression release control signal from the communication suppression/communication suppression release control signal receptor 203 and turning on the transmit path of the wireless communication terminal.

Further, the receipt path on/off switching block 205 may conduct the procedure 606 of switching the terminal into normal communication mode by receiving communication suppression release control signal from the communication suppression/communication suppression release control signal receptor 203 and turning on the receipt path of the terminal.

Detailed description on the other functions will be omitted here since they are similar to those of the conventional wireless communication terminal.

FIG. 7 is a flow chart showing a method for automatically switching the communication/communication suppression mode of the wireless communication terminal in accordance with another concrete embodiment of the present invention. In this embodiment, a communication suppression control signal generator 301 and a communication suppression release control signal generator 302 are installed at the entrance and exit, respectively but the transmit and receipt paths are switched on and off through the central processing unit 306.

First of all, the communication suppression/communication suppression release control signal receptor 303 receives communication suppression control signal from the communication suppression control signal generator 301, which being installed inside the entrance of a region where call communication needs to be restricted such as a hospital or an airplane, generates communication suppression control signal and radiates it in the form of a feeble radio wave (0 dBm(1 mW)~13 dBm(20 mW)) 701.

After that, the central processing unit 306 receives communication suppression control signal from the communication suppression/communication suppression release control signal receptor 303 and notifies a corresponding base station of the terminal being in the communication restriction area 702.

Then, the transmit path on/off switching block 304 blocks the RF radiation from the terminal antenna by receiving communication suppression control signal from the central processing unit 306 and turning off the transmit path of the wireless communication terminal, while keeping the terminal power-on 703.

Further, the receipt path on/off switching block 305 may conduct the procedure 704 of minimizing power consumption of the wireless communication terminal by receiving communication suppression control signal from the central processing unit 306 and turning off the receipt path of the terminal. Here, the receipt path on/off switching block 305 may turn off the receipt path of the terminal by receiving communication suppression control signal directly from the communication suppression/communication suppression release control signal receptor 303, not by receiving it through the central processing unit 306.

Meanwhile, the communication suppression/communication suppression release control signal receptor 303 receives communication suppression release control signal from the communication suppression release control signal generator 302, which being installed outside the exit of a region where call communication needs to be restricted such as a hospital or an airplane, generates communication suppression release control signal and radiates it in the form of a feeble radio wave 705.

After that, the transmit path on/off switching block 304 switches the terminal into normal communication mode by receiving communication suppression release control signal from the central processing unit 306 and turning on the transmit path of the wireless communication terminal.

Further, the receipt path on/off switching block 305 may conduct the procedure 707 of switching the terminal into normal communication mode by receiving communication suppression release control signal from the central processing unit 306 and turning on the receipt path of the terminal. Here, the receipt path on/off switching block 305 may turn on the receipt path of the terminal by receiving communication suppression release control signal directly from the communication suppression/communication suppression release control signal receptor 303, not by receiving the communication suppression release control signal through the central processing unit 306.

Detailed description on the other functions will be omitted here since they are similar to those of the conventional wireless communication terminal.

FIG. 8 is a flow chart showing a method for automatically switching the communication/communication suppression mode of the wireless communication terminal in accordance with still another concrete embodiment of the present invention. In this embodiment, the communication suppression control signal generator 401 is set up to cover the entire communication restriction area and the transmit and receipt paths are turned on and off through the central processing unit 403.

First of all, the central processing unit 403 checks if communication suppression control signal is received from the communication suppression control signal generator 401, which being installed in a region where call communication needs to be restricted such as a hospital or an airplane, generates communication suppression control signal and radiates it in the form of a feeble radio wave (0 dBm(1 mW)~13 dBm(20 mW)) 801.

After the checking 801, if the communication suppression control signal is received, it checks the state of the wireless communication terminal 802 and if the terminal is already in communication suppression mode, it proceeds to the procedure 801 of confirming the receipt of the communication suppression control signal, and if it's not in communication suppression mode, it notifies a corresponding base station of the terminal being in the communication restriction area 803.

Then, the central processing unit 403 controls the transmit path on/off switching block 405 to turn off the transmit path of the wireless communication terminal and blocks the RF radiation from the terminal antenna, while still keeping the terminal power-on 804.

Further, the central processing unit 403 may conduct the procedure 805 of minimizing power consumption of the wireless communication terminal by controlling the receipt path on/off switching block 408 to turn off the transmit path of the terminal.

Meantime, if the result of the checking 801 shows that the communication suppression control signal is not received for a predetermined time, for example for five seconds or so, it goes to the procedure 801 of confirming the receipt of the communication suppression control signal and if communication suppression control signal is not received for the predetermined time, the central processing unit 403 controls the transmit path on/off switching block 405 to turn on the transmit path and switches it into normal communication mode 807.

Also, the central processing unit 403 may control the receipt path on/off switching block 408 to turn on the receipt path of the terminal and conduct a procedure 808 of switching it into normal communication mode.

Detailed description on the other functions will be omitted here since they are similar to those of the conventional wireless communication terminal.

FIG. 9 is a detailed flow chart depicting the process of notifying a base station of the terminal switching into the communication suppression mode in accordance with an embodiment of the present invention.

As described above, if the wireless communication terminal entering a communication restriction area receives communication suppression control signal 901, it notifies a corresponding base station of the terminal being in the communication restriction area 902, and turns off the a transmit/receipt (Tx/Rx) path.

For the calls received after the communication suppression, the wireless communication network informs the caller of its being in the communication restriction area 903, asks for a message and stores the message 904. Later, the terminal getting out of the communication restriction area switches itself into communication mode automatically and receives the recorded message 905.

The present invention described above is automatically set into communication suppression mode when it is in a communication restriction area such as a hospital and an airplane, and when out of it, its mode is switched back into the communication mode, according to control signals.

Also, the present invention keeps the wireless communication terminal power-on and blocks RF radiation from its antenna, thus protecting precision machinery from the effect, addressing the interference problem with other systems, capable of being switched back into communication mode when communication suppression release signal is received or when communication suppression signal is not received any more because its power is kept on.

Further, minimizing power consumption by turning off the reception mode while keeping the terminal power-on, the present invention extends the usable time of a battery.

Besides, the present invention notifies a base station of a wireless communication terminal being in the communication restriction area, switches it into communication suppression mode, and the base station that recognizes that the terminal is in the communication restriction area, which is distinguished from getting out of a region where communication is possible, does not page the corresponding terminal, thus reducing the power consumption of the base station and bringing almost same effect as extending the capacity of the base station, and informs a user trying to reach the wireless terminal that the corresponding terminal is in a communication restriction area, asking to leave a message.

While the present invention has been described with respect to certain preferred embodiments, it will be apparent to those skilled in the art that various changes and modifications may be made without departing from the scope of the invention as defined in the following claims.

What is claimed is:

1. An apparatus for automatically switching a communication/communication suppression mode of a wireless communication terminal, comprising:
   a communication a suppression control signal reception means for receiving a communication suppression control signal radiated from an external communication suppression control signal generation means that is set up inside an entrance of a communication restriction area, generates and radiates the communication suppression control signal which is a feeble radio signal;
   a communication suppression release control signal reception means for receiving a communication suppression release control signal from an external communication suppression release control signal generation means that is set up outside an exit of the communication restriction area, generates and radiates the communication suppression release control signal which is a feeble radio signal;
   a central processing means for receiving a communication suppression control signal from the communication suppression control signal reception means and notifying a base station of the wireless communication terminal being in the communication restriction area, and for controlling the wireless communication terminal to operate normally in response to the communication suppression release control signal from the communication suppression release control signal reception means; and
   a transmit path on/off switching means for blocking a radio frequency (RF) signal radiated from an antenna of the terminal while keeping the wireless communication terminal power-on by receiving the communication suppression control signal from the central processing means and turning off the transmit path of the wireless communication terminal, and for switching it into a normal communication mode by receiving the communication suppression release control signal from the central processing means and turning on the transmit path of the wireless communication terminal.

2. The apparatus as recited in claim 1, further including a receipt path on/off switching means for turning off the receipt path of the terminal in response to the communication suppression control signal from the communication suppression control signal reception means, in order to minimize power consumption of the wireless communication terminal, and for turning on the receipt path of the wireless communication terminal in response to the communication suppression release control signal from the communication suppression release control signal reception means in order to switch the wireless communication terminal into the normal communication mode.

3. The apparatus as recited in claim 1, further including a receipt path on/off switching means for turning off the receipt path of the terminal in response to the communication suppression control signal from the central processing means, in order to minimize power consumption of the wireless communication terminal, and for turning on the receipt path of the wireless communication terminal in response to the communication suppression release control signal from the central processing means in order to switch the wireless communication terminal into the normal communication mode.

4. The apparatus as recited in claim 3, wherein the receipt path on/off switching means prevents an input signal from being inputted to a low noise amplifier on the receipt (Rx) path of the wireless communication terminal.

5. The apparatus as recited in claim 1, wherein the base station notified of the wireless communication terminal being in the communication restriction area which is different from getting out of a service coverage zone, does not page the wireless communication terminal any more and informs a user trying to reach the wireless communication terminal that the wireless communication terminal is in the communication restriction area.

6. The apparatus as recited in claim 1, wherein the transmit path on/off switching means controls the RF signal radiated from the wireless communication terminal by preventing an input signal from being inputted to a power amplifier on the transmit (Tx) path of the wireless communication terminal while switching the wireless communication terminal into the communication suppression mode.

7. An apparatus for automatically switching a communication/communication suppression mode of a wireless communication terminal, comprising:
   a communication a suppression control signal reception means for receiving a communication suppression control signal radiated from an external communication suppression control signal generation means that is set up inside an entrance of a communication restriction area, generates and radiates the communication suppression control signal which is a feeble radio signal;
   a central processing means for receiving a communication suppression control signal from the communication suppression control signal reception means and notifying a base station of the wireless communication terminal being in the communication restriction area, and if the communication suppression control signal is not received from the communication suppression control signal reception means for a predetermined time, for controlling the wireless communication terminal to operate normally by transmitting a transmit path ON control signal; and
   a transmit path on/off switching means for blocking a radio frequency (RF) signal radiated from an antenna of the terminal while keeping the wireless communication terminal power-on by receiving the communication suppression control signal from the central processing means and turning off the transmit path of the wireless communication terminal, and for switching it into a normal communication mode by receiving the communication suppression release control signal from the central processing means and turning on the transmit path of the wireless communication terminal.

8. The apparatus as recited in claim 7, further including:
   a receipt path on/off switching means for turning off the receipt path of the terminal in response to the communication suppression control signal from the communication suppression control signal reception means, in order to minimize power consumption of the wireless communication terminal, and for turning on the receipt path of the wireless communication terminal in response to the receipt path ON control signal from the communication suppression release control signal reception means in order to switch the wireless communication terminal into the normal communication mode.

9. The apparatus as recited in claim 8, wherein the receipt path on/off switching means prevents an input signal from being inputted to a low noise amplifier on the receipt (Rx) path of the wireless communication terminal.

10. The apparatus as recited in claim 7, wherein the base station notified of the wireless communication terminal being in the communication restriction area which is different from getting out of a service coverage zone, does not page the wireless communication terminal any more and informs a user trying to reach the wireless communication terminal that the wireless communication terminal is in the communication restriction area.

11. The apparatus as recited in claim 7, wherein the transmit path on/off switching means controls the RF signal radiated from the wireless communication terminal by preventing an input signal from being inputted to a power amplifier on the transmit (Tx) path of the wireless communication terminal while switching the wireless communication terminal into the communication suppression mode.

12. An apparatus for automatically switching a communication/communication suppression mode of a wireless communication terminal, comprising:
a communication suppression control signal generation means set up inside an entrance of a communication restriction area, for generating and radiating a communication suppression control signal used for turning off a transmit path of the wireless communication terminal in order to block a radio frequency (RF) signal radiated from an antenna of the terminal while keeping the wireless communication terminal power-on; and
a communication suppression release control signal generation means set up outside an exit of the communication restriction area, for generating and radiating a communication suppression release, control signal used for turning on the transmit path of the wireless communication terminal in order to switch the wireless communication terminal into a normal communication mode from the communication suppression mode and used for notifying a base station of the wireless communication terminal being in a communication restriction area.

13. The apparatus as recited in claim 12, wherein the communication suppression control signal radiated from the communication suppression control signal generation means further performs a function of turning off the receipt path of the wireless communication terminal in order to minimize its power consumption, and the communication suppression release control signal radiated from the communication suppression release control signal generation means further performs a function of turning on the receipt path of the wireless communication terminal in order to switch it into the normal communication mode.

14. An apparatus for automatically switching the communication/communication suppression mode of a wireless communication terminal, comprising:
a communication suppression control signal generation means set up inside an entrance of a communication restriction area, for notifying a base station of the wireless communication terminal being in the communication restriction area, for generating and radiating a communication suppression control signal used for turning off a transmit path of the wireless communication terminal in order to block a radio frequency (RF) signal radiated from an antenna of the terminal while keeping the wireless communication terminal power-on, and for, if the communication suppression control signal is not received for a predetermined time, turning on the transmit path of the wireless communication terminal in order to switch it into a normal communication mode.

15. The apparatus as recited in claim 14, wherein the communication suppression control signal radiated from the communication suppression control signal generation means further performs a function of turning off a receipt path of the wireless communication terminal to minimize power consumption of the wireless communication terminal, and for switching it into the normal communication mode by, if the communication suppression control signal is not received for a predetermined time, turning on the receipt path of the wireless communication terminal.

16. A method for automatically switching the communication/communication suppression mode a wireless communication terminal, comprising the steps of:
a) at a central processing means, receiving a communication suppression control signal radiated from an external communication suppression control signal generation means that is set up inside an entrance of a communication restriction area, generates and radiates the communication suppression control signal which is a feeble radio signal, through a communication suppression/communication suppression release control signal reception means;
b) at the central processing means, notifying a base station of the wireless communication terminal being in the communication restriction area;
c) at the central processing means, turning off a transmit path of the wireless communication terminal in response to the communication suppression control signal in order to block a radio frequency (RF) signal radiated from an antenna of the wireless communication terminal while keeping the wireless communication terminal power-on;
d) at the central processing means, receiving a communication suppression release control signal from a communication suppression release control signal generation means that is set up outside an exit of the communication restriction area, generates and radiates the communication suppression release control signal which is a feeble radio signal, through a communication suppression/communication suppression release control signal reception means; and
e) at the central processing means, controlling a transmit path on/off switching means to turn on the transmit path of the wireless communication terminal in order to switch the wireless communication terminal into a normal communication mode.

17. The method as recited in claim 16, further including:
f) at the central processing means, controlling a transmit path on/off switching means to turn off a receipt path of the wireless communication terminal in response to the communication suppression control signal to minimize power consumption of the wireless communication terminal;
g) at the central processing means, controlling a transmit path on/off switching means to turn on the receipt path of the wireless communication terminal in response to the communication suppression release control signal to switch the wireless communication terminal into the normal communication mode.

18. The method as recited in claim 16, wherein the base station recognizes the wireless communication terminal is in a communication restriction area which is distinguished from getting out of a service coverage zone, does not page the wireless communication terminal any more, and informing a caller trying to reach the wireless communication terminal that the wireless communication terminal is in a communication restriction area.

19. A method for automatically switching the communication/communication suppression mode of a wireless communication terminal, comprising the steps of:
 a) at a central processing means, checking whether a communication suppression control signal radiated from a communication suppression control signal generation means that is set up inside an entrance of a communication restriction area, generates and radiates the communication suppression control signal which is a feeble radio signal;
 b) if the communication suppression control signal is received, determining whether the wireless communication terminal is in a communication suppression mode, if so, proceeding to the step a), if not, controlling the transmit path on/off switching means to turn off a transmit path of the wireless communication terminal in response to the communication suppression control signal in order to block a radio frequency (RF) signal radiated from an antenna of the wireless communication terminal while keeping the wireless communication terminal power-on;
 c) if the communication suppression control signal is not received for a predetermined time, controlling the transmit path on/off switching means to turn on the transmit path of the terminal in order to switch the wireless communication terminal into normal communication mode; and
 d) if the communication suppression control signal is received, notifying a base station of the wireless communication terminal being in the communication restriction area.

20. The method as recited in claim 19, further including the steps of:
 e) if the communication suppression control signal is received, controlling a receipt path on/off switching means to turn off a receipt path of the wireless communication terminal in order to minimize power consumption of the wireless communication terminal; and
 f) if the communication suppression control signal is not received for the predetermined time, controlling the receipt path on/off switching means to turn on the receipt path of the wireless communication terminal in order to switch the wireless communication terminal into a normal communication mode.

21. The method as recited in claim 20, wherein the base station recognizes the wireless communication terminal is in a communication restriction area which is distinguished from getting out of a service coverage zone, does not page the wireless communication terminal any more, and informing a caller trying to reach the wireless communication terminal that the wireless communication terminal is in a communication restriction area.

22. A computer readable recording medium for recording a program for executing a method for automatically switching the communication/communication suppression mode a wireless communication terminal, the method comprising the steps of:
 a) at a central processing means, receiving a communication suppression control signal radiated from an external communication suppression control signal generation means that is set up inside an entrance of a communication restriction area, generates and radiates the communication suppression control signal which is a feeble radio signal, through a communication suppression/communication suppression release control signal reception means;
 b) at the central processing means, notifying a base station of the wireless communication terminal being in the communication restriction area;
 c) at the central processing means, turning off a transmit path of the wireless communication terminal in response to the communication suppression control signal in order to block a radio frequency (RF) signal radiated from an antenna of the wireless communication terminal while keeping the wireless communication terminal power-on;
 d) at the central processing means, receiving a communication suppression release control signal from a communication suppression release control signal generation means that is set up outside an exit of the communication restriction area, generates and radiates the communication suppression release control signal which is a feeble radio signal, through a communication suppression/communication suppression release control signal reception means; and
 e) at the central processing means, controlling a transmit path on/off switching means to turn on the transmit path of the wireless communication terminal in order to switch the wireless communication terminal into a normal communication mode.

23. The computer readable recording medium as recited in claim 22, further including:
 f) at the central processing means, controlling a transmit path on/off switching means to turn off a receipt path of the wireless communication terminal in response to the communication suppression control signal to minimize power consumption of the wireless communication terminal; and
 g) at the central processing means, controlling a transmit path on/off switching means to turn on the receipt path of the wireless communication terminal in response to the communication suppression release control signal to switch the wireless communication terminal into the normal communication mode.

24. A computer readable recording medium for recording a program for executing a method for automatically switching the communication/communication suppression mode of a wireless communication terminal, the method comprising the steps of:
 a) at a central processing means, checking whether a communication suppression control signal radiated from a communication suppression control signal generation means that is set up inside an entrance of a communication restriction area, generates and radiates the communication suppression control signal which is a feeble radio signal;
 b) if the communication suppression control signal is received, determining whether the wireless communication terminal is in a communication suppression mode, if so, proceeding to the step a), if not, controlling the transmit path on/off switching means to turn off a transmit path of the wireless communication terminal in response to the communication suppression control signal in order to block a radio frequency (RF) signal radiated from an antenna of the wireless communication terminal while keeping the wireless communication terminal power-on;

c) if the communication suppression control signal is not received for a predetermined time, controlling the transmit path on/off switching means to turn on the transmit path of the terminal in order to switch the wireless communication terminal into normal communication mode; and d) if the communication suppression control signal is received, notifying a base station of the wireless communication terminal being in the communication restriction area.

25. The computer readable recording medium as recited in claim 24, further including the steps of:

e) if the communication suppression control signal is received, controlling a receipt path on/off switching means to turn off a receipt path of the wireless communication terminal in order to minimize power consumption of the wireless communication terminal; and f) if the communication suppression control signal is not received for the predetermined time, controlling the receipt path on/off switching means to turn on the receipt path of the wireless communication terminal in order to switch the wireless communication terminal into a normal communication mode.

* * * * *